Figure 1:
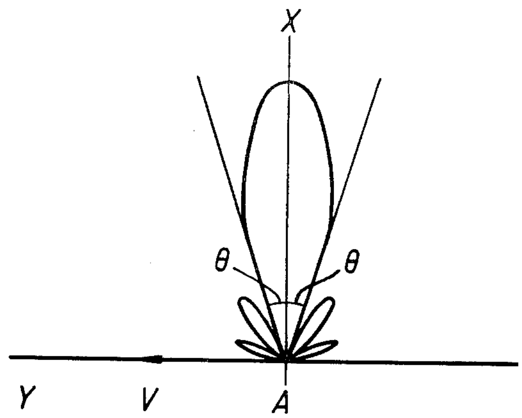

United States Patent [19]

Blythe et al.

[11] 4,150,376

[45] Apr. 17, 1979

[54] SIDE-LOOKING RADAR SYSTEMS

[75] Inventors: John H. Blythe, Chelmsford; Seville R. Brooks, Ongar, both of England

[73] Assignee: The Marconi Company Limited, Chelmsford, England

[21] Appl. No.: 856,481

[22] Filed: Dec. 1, 1977

[30] Foreign Application Priority Data

Dec. 14, 1976 [GB] United Kingdom ............... 52185/76

[51] Int. Cl.$^2$ ............................ G01S 9/42; G01S 7/30

[52] U.S. Cl. .................................. 343/7.7; 343/5 CM; 343/17.1 R

[58] Field of Search ............... 343/7.7, 17.1 R, 5 CM; 325/369

[56] References Cited

U.S. PATENT DOCUMENTS

| | | | |
|---|---|---|---|
| Re. 27,092 | 3/1971 | Stifter et al. | 343/7.7 |
| 3,483,558 | 12/1969 | Wiley | 343/7.7 |
| 3,636,561 | 1/1972 | Le Parquier et al. | 343/7.7 |
| 3,680,099 | 7/1972 | Herman et al. | 343/7.7 |
| 4,011,561 | 3/1977 | Dounce | 343/17.1 R |
| 4,040,055 | 8/1977 | Donahue et al. | 343/7.7 |

*Primary Examiner*—Maynard R. Wilbur
*Assistant Examiner*—Lawrence Goodwin
*Attorney, Agent, or Firm*—Diller, Ramik & Wight

[57] ABSTRACT

The invention provides a side-looking radar for use on a moving carrier and for exploring space laterally with respect to the displacement direction of the carrier. The receiver includes a non-coherent detector having a reference signal input. The average differential phase between the phases of successive received echo pulses appearing at the output of the detector is evaluated and utilised to control a phase shifting arrangement so as to bring the phases of the successive received echo pulses into alignment and establish coherence between the detector and the radar transmitter.

12 Claims, 5 Drawing Figures

SIDE-LOOKING RADAR SYSTEMS

This invention relates to a side-looking radar system.

In side-looking radar systems known to the applicants, the operation is "coherent" and examples of such sidelooking coherent pulse radar systems are disclosed in our U.K. Pat. No. 1,455,871. By the term "coherent" is meant a radar system in which the useful received echo pulses originate from transmitted pulses obtained by pulse modulating a continuous wave, or where each echo pulse is phase detected with respect to a reference wave which is phase locked with the carrier of the transmitted pulse from which a considered echo pulse originates.

The side-looking coherent pulse radar system, disclosed in our said patent, utilises an antenna which produces a symmetrical directive signal lobe radiation pattern, the gain of which is a maximum along the symmetry axis and which axis is directed perpendicularly to the direction of displacement of the carrier upon which the radar system is mounted. The processing of received echoes is based on the determination of the instant at which the Doppler frequency of a given target goes through zero and at this instant a stationary target is located exactly on the symmetry axis. However, in accordance with our said patent, a correlation process is performed with a reference correlation waveform having a centre frequency which is offset relative to sampled received signal pulses by substantially one half the transmitted pulse repetition frequency of the radar and in this manner, moving targets may be located. It should be noted that the term "stationary target," as used herein, includes targets which move parallel to the displacement of the system carrier and that by the term "moving targets," as used herein, is meant targets which have a radial component of velocity with respect to the system carrier.

The necessity to use a coherent detection arrangement has proved an onerous requirement and it is an object of the present invention to provide a side-looking radar system which is non-coherent, by which term is meant a radar system where the reference wave is derived independently of the transmitted pulse carrier wave, i.e. the relative phase of the reference wave and the intermediate frequency signal derived from a considered echo pulse varies randomly from one pulse to another.

According to this invention, a side-looking pulse radar system for use on a moving carrier and for exploring space laterally with respect to the displacement direction of said carrier includes transmitting means for transmitting pulses, receiving means for receiving echo pulses returned from a target and comprising a non-coherent detection means having a reference signal input and an output, means for supplying a reference signal to said reference signal input, means for evaluating the average differential phase between the phases of successive received echo pulses connected to the output of the detection means, and phase shifting means arranged to bring the phases of the successive received echo pulses into substantial alignment in dependence upon the output of the means for evaluating, whereby substantial coherence of the detection means with the transmitting means is established.

Preferably the detection means comprises two detectors and the means for supplying a reference signal in an oscillator for producing said reference signal which reference signal comprises two signals in phase quadrature, one of the said signals being applied to one of the detectors and the other of said signals being applied to the other detector.

In a preferred embodiment, the means for evaluating comprises an analogue-to-digital converter arranged to sample the output from both of the detectors, a store connected to the output of the converter for storing samples of echo signals produced by two consecutive transmitted pulses, and a phase comparator for determining the average differential phase between the samples produced by each of the two transmitted pulses, and wherein the phase shifting means is arranged to alter the phase of the samples produced by the last of the two transmitted pulses in dependence upon said average differential phase, so that the phase of the samples corresponding thereto in the converter is brought into substantial phase alignment with the samples in the converter corresponding to samples produced by the first of the transmitted pulses. Advantageously, the phase shifting means is connected to a further store arranged to receive the substantially phase aligned samples, a correlation processor is connected to the output of said further store to perform a correlation process with a correlation waveform, and an indicator is provided for displaying the output of said correlation processor.

In a further embodiment, the means for evaluating comprises a phase comparator connected to the output of both the detectors and arranged to determine the average differential phase between echo signals produced by two consecutive transmitted pulses and wherein the phase shifting means is arranged to alter the phase of the signals produced by the last of the two transmitted pulses in dependence upon said average differential phase so that the phase of the signals produced by the said last pulse is brought into substantial phase alignment with the signals produced by the first of the transmitted pulses and to subsequently apply the phase corrected signal to an analogue-to-digital converter. Advantageously, the phase shifting means is connected to a store arranged to receive the substantially phase aligned signals, a correlation processor is connected to the output of said store to perform a correlation process with a correlation waveform, and an indicator is provided for displaying the output of said correlation processor.

Conveniently, the correlation processor is arranged to multiply received in-phase and phase-quadrature samples by amplitude modulated in-phase and phase-quadrature samples of said reference correlation waveform. The reference correlation waveform may have a centre frequency which is offset relative to the sampled received signal pulse by substantially half the transmitted pulse repetition frequency for displaying moving targets on the indicator, or the reference correlation waveform may be centred substantially on zero frequency for displaying stationary targets.

In said one preferred embodiment, switch means are arranged at the output of the analogue-to-digital converter and at the input of the first mentioned store with two signals channels therebetween, and in one of said signal channels as arrangement for multiplying sampled received signals by minus one after each alternate transmitted pulse such that, in operation, when the switch means are connected to the channel containing said arrangement and the correlation waveform is centred substantially on zero frequency, a signal indicative of moving targets is obtained and when the switch means are connected to the second channel, a signal indicative of stationary targets is obtained. Alternatively, where said further embodiment is utilised, switch means are arranged at the output of the analogue-to-digital converter and at the input of the store with two signal channels therebetween, and in one of said signal channels an arrangement for multiplying sampled received signals by minus one after each alternate transmitted pulse such that, in operation, when the switch means are connected to the channel containing said arrangement and the correlation waveform is centred substantially on zero frequency, a signal indicative of moving targets is obtained and when the switch means are connected to the second channel, a signal indicative of stationary targets is obtained.

Conveniently, the stores are shift register stores.

Normally, said system is arranged so that the transmitting means and the receiving means are connected to an antenna which has a symmetrical directive lobe, the gain of which is maximum along the symmetry axis, said axis being substantially normal at any instant to the displacement direction of said carrier and being outside the vertical plane comprising said direction.

Figure 2:
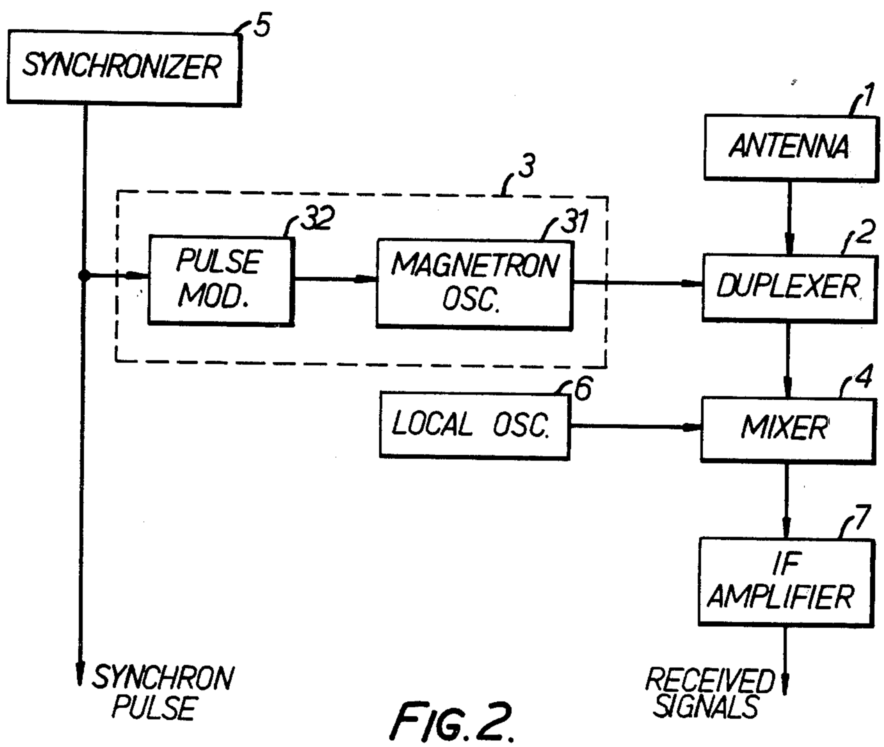
Figure 3:
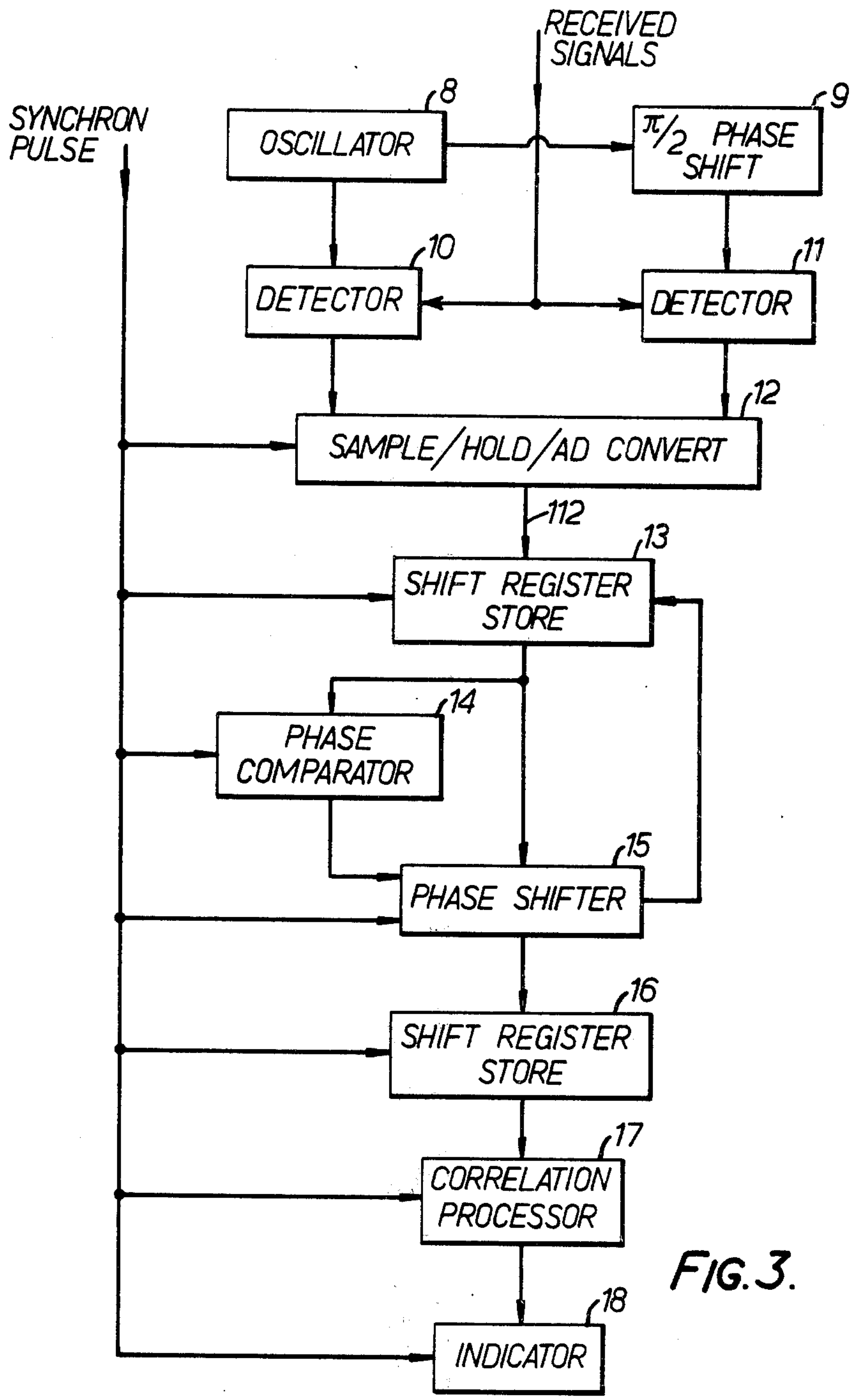
Figure 4:
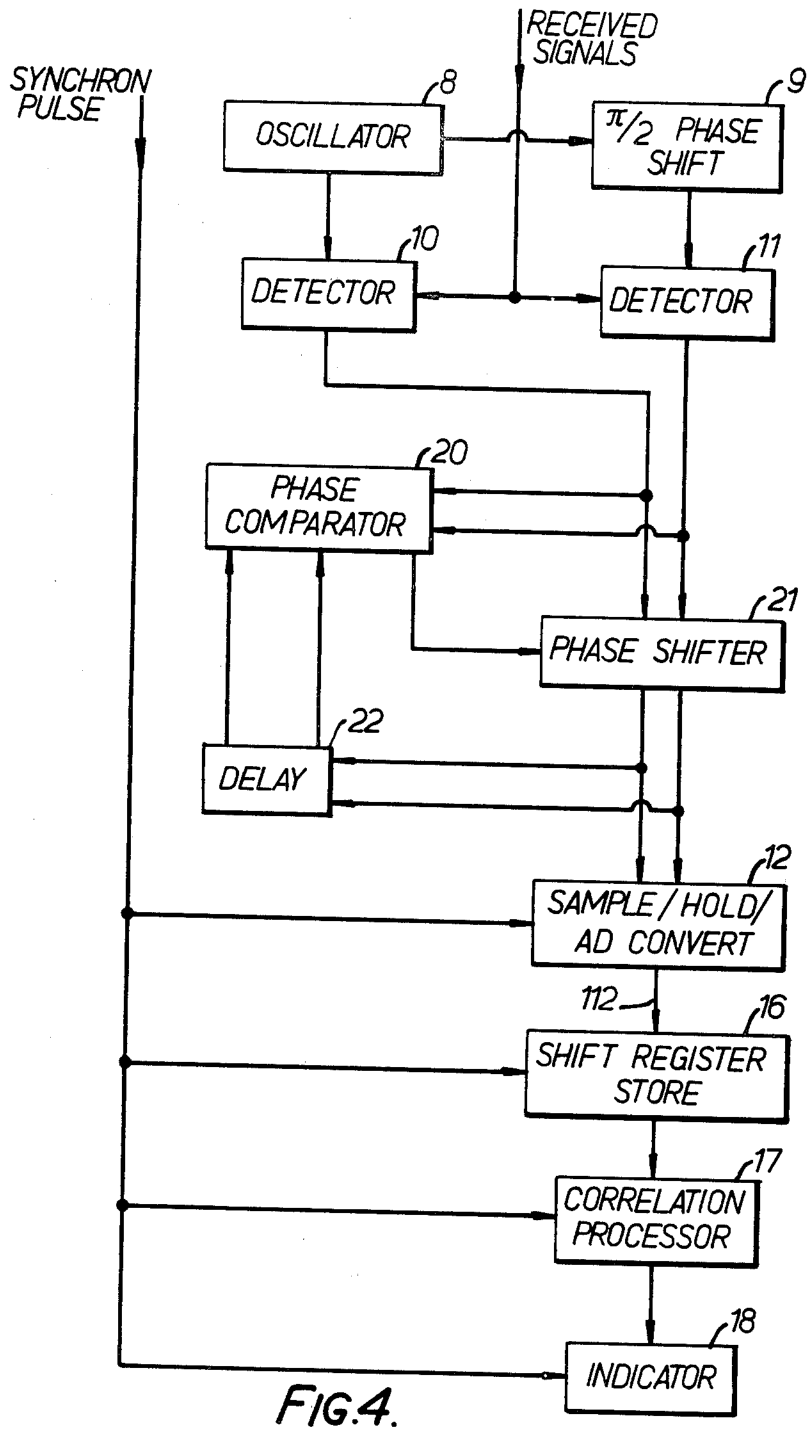
Figure 5:
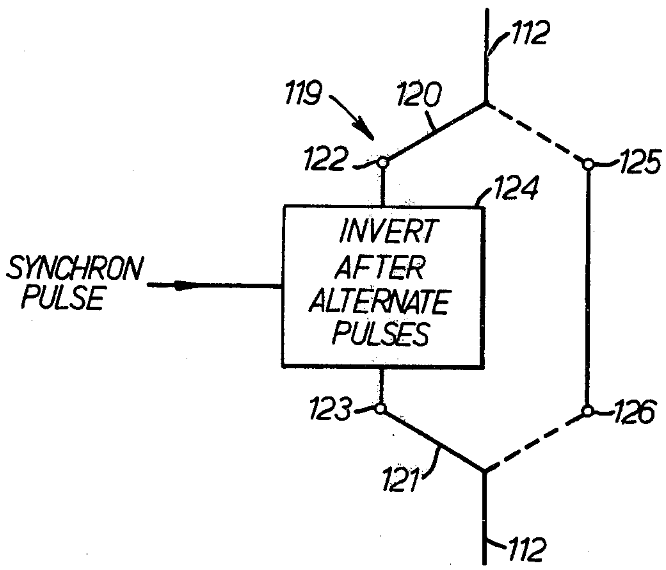

The invention will now be described, by way of example, with reference to the accompanying drawings in which FIG. 1 shows a radiation pattern in polar co-ordinates of a side-looking radar system in accordance with this invention, FIG. 2 is a block schematic diagram of the side-looking radar system in accordance with this invention to the stage representing I.F. amplification, FIG. 3 is a block schematic diagram showing the arrangement from the I.F. amplification stage to an indicator for displaying targets, FIG. 4 is a block schematic diagram of an alternative arrangement to that shown in FIG. 3, and FIG. 5 is a schematic diagram showing how both moving and stationary targets may be displayed, but not both simultaneously.

In the Figures like reference numerals denote like parts.

Referring to FIGS. 1 and 2, the side-looking radar system is carried by an aircraft A travelling at a velocity V along a flight path AY. The radiation pattern of the antenna 1 has one main lobe which is symmetrical with respect to an axis AX which is substantially normal to the aircraft flight path AY and the gain of the main lobe is a maximum along the axis AX, angle $\theta$ representing the one half beam width and the axis AX having a direction such that the main lobe illuminates targets on the ground.

The antenna 1 is connected alternately, by a duplexer 2, to a transmitter 3 and one input of a receiving mixer 4. The transmitter 3 includes a magnetron oscillator 31 and a pulse modulator 32 which is fed with synchronising pulses from a synchroniser 5. The transmitter 3 operates in known manner and the received signals applied to the mixer 4 are heterodyned with signals from a local oscillator 6 connected to a further input of the mixer 4 so that intermediate frequency signals may be fed to an I.F. amplifier 7. For the sake of clarity only one block is shown representing the I.F. amplification stage because the various amplification stages required for high frequency and medium frequency transmission and reception may adopt any known form per se and are not, therefore, shown separately.

The arrangement shown in FIG. 3 has a further oscillator 8, the frequency of which is governed by the frequency of the magnetron oscillator 31 and the frequency of the local oscillator 6 so that the Doppler frequency shift of a target can be determined in accordance with known practice. Output from the oscillator 8 is fed to a $\pi/2$ phase shifter 9 and to a phase detector 10, the output of the phase shifter 9 being connected to a further phase detector 11 so that the detectors 10 and 11 are fed in phase quadrature to one another with reference signals from the oscillator 8. A further input of each of the detectors 10, 11 is applied with the received I.F. signals from the amplifier 7 so that at the output of the detectors are phase quadrature signals representative of the phase produced by a moving or stationary target.

Output from the detectors 10, 11 and from the synchroniser 5 is fed to an analogue-to-digital converter 12 which is arranged to produce two series of binary numbers representing the amplitudes of the two analogue reference waveforms applied from the phase detectors 10, 11. The synchroniser 5 controls the analogue-to-digital converter 12 so that m sample pairs are produced at instants of time $n\Delta$, $(n+1)\Delta, \ldots (n+m-1)\Delta$ after a pulse is transmitted from the transmitter 3, where n is a whole number and $\Delta$ is the sampling interval chosen to be approximately one half the time duration of the transmitted pulse, so that there are two sample pairs, each pair consisting of components from the two quadrature channels per transmitted pulse length. Connected to receive output from the converter 12 over a signal path 112 is a shift register store 13 having a pair of shift registers, not separately shown, for each sampling instant, making a total of m pairs of shift registers within the store 13.

The shift registers of the shift registers store 13 each have two locations and are driven by pulses from the synchroniser 5 so that after each transmitted pulse, each one of the m shift register pairs receives one new pair of phase quadrature samples. The shift register store 13 thus holds the sample pairs from the two consecutive most recently transmitted pulses. Output from the store 13 is applied to a digital phase comparator 14 which, under the influence of clock pulses from the synchroniser 5, evaluates the average phase differential between the two sample pairs over the m shift register pairs; that is, the difference in phase between the sample pairs of the echo signal produced by the later pulse is compared with the phase of the sample pairs of the echo signal produced by the first pulse and the difference averaged. The contents of the second location of the shift registers, which holds those samples obtained from echoes caused by the later transmitted pulse, are then phase corrected in a digital phase shifter 15 in dependence upon the average differential phase between the sample pairs in the first and second locations so as to bring the quadrature samples in the second location of the shift register store 13 into substantial phase alignment with those samples stored in the first location of the shift register store 13, where phase alignment is meant in the sense of an arithmetic average of the m phase differences between the sample pairs; all the corrected sample pairs from the echo signals caused by later transmitted pulses are then phase shifted to the same phase of alignment. The phase shifter 15 is clocked by the synchroniser 5 so that the contents of the first location of the shift registers within the shift register store 13 are passed to a shift register store 16, also clocked by the synchroniser 5, and the contents of the second location of the shift registers within the shift register store 13, which are now substantially phase corrected, are fed from the phase shifter 15 to the first location of the shift registers within the shift register store 13 prior to reception of the next transmitted pulse return.

The shift register store 16 holds m pairs of shift registers (not separately shown) and each of the shift registers has l locations and is arranged such that after each transmitted pulse, each one of the m shift register pairs receives one new pair of quadrature samples from the shift register 13, and a further pair of samples is passed to a correlation processor 17 which receives clock pulses from the synchroniser 5. Thus, each pair of shift registers of the shift register store 16 stores the last l in phase and phase quadrature amplitude samples of signals received from targets at one particular range. The operation of the correlation processor 17 will now be described for one pair of the pairs of shift registers, the processing for all other pairs of shift registers being similar. The samples in the in-phase shift register will be labelled $p_1, p_2, \ldots p_l$, and those in the phase quadrature shift registers be labelled $q_1, q_2 \ldots q_l$. The correlation processor 17 multiplies each of these samples by $a_i$, $b_i$ which are amplitude modulated in-phase and phase quadrature samples respectively of a reference linear frequency modulated waveform, and then sums the result. Quadrature outputs U and V are thereby produced and may be expressed as follows:

$$U = \sum_{i=1}^{l} (p_i \cdot a_i + q_i \cdot b_i)$$

$$V = \sum_{i=1}^{l} (p_i \cdot b_i - q_i \cdot a_i)$$

Output from the correlation processor 17 is passed to a display indicator 18 which also receives clock pulses from the synchroniser 5. The indicator 18 requires a unipolar (e.g. positive only) input and this is obtained from U and V by any known non-linear operation such as modulus detection, which employs $|U| + |V|$, or square law detection, which employs $U^2+V^2$. The output is then displayed in any manner known per se by the indicator 18.

If the samples $a_i$ and $b_i$ which are herein termed "correlation waveform samples" are arranged to be centred on a frequency which is offset from zero frequency by substantially one half the transmitted pulse repetition frequency, then moving targets will be displayed by the indicator 18. Alternatively, if the correlation waveform samples are centred on zero frequency, then stationary targets will be displayed.

If, instead of using digital techniques to align the phases of echo signals produced by consecutively transmitted pulses, as described above with reference to FIG. 3, the phases of the signals produced by two consecutive pulses may be aligned using an analogue method, as will now be described with reference to FIG. 4.

In FIG. 4 the signals from the phase quadrature detectors 10, 11 are passed to an analogue phase comparator 20 and to an analogue phase shifter 21. The phase shifter 21 changes the phase of the signals from the last of two consecutive transmitted pulses by an amount which is directly proportional to the average differential phase between the phases of echo signals produced from the last transmitted pulse and the first pulse of two consecutive transmitted pulses, which echo signals produced by the first pulse, after stabilisation of the arrangement, will already have been phase shifted. The echo signal from the first pulse is applied from the phase shifter 21 to a delay network 22 having a delay time equal to the time difference between the transmission of the two consecutive pulses. The delay network 22 applies the phase corrected first pulse to a further input of the phase comparator 20 at the same time as the other input of the comparator 20 receives signals corresponding to the last transmitted pulse and supplies an output to the phase shifter 21 in dependence upon the average differential phase between the echo signals produced by the two consecutive pulses so that the phase shifter brings the phase of the echo signals produced by the last transmitted pulse into substantial alignment with the echo signals produced by the first of the two consecutive transmitted pulses. The phase corrected signal is then passed to the analogue-to-digital converter 12 and thence over a signal path 112 to the shift register store 16, the correlation processor 17 and the indicator 18, which all operate in the manner described above in relation to FIG. 3.

It is envisaged that the phase comparator 14 or 20 may provide a weighted average of the differential phase between two consecutive signals which are phase compared, where the weight attached to each component within the average process depends upon the amplitudes of those components.

As described thus far, the side-looking radar system is capable of producing either an indication of moving targets or stationary targets in dependence upon whether or not the correlation waveform has a centre frequency which is offset from zero, but an alternative arrangement, shown in FIG. 5, is capable of producing information for displaying both stationary and moving targets, but not both simultaneously. The arrangement, generally referenced 119, is inserted into the connection path 112 and consists of two change-over switches 120 and 121 which are connected to the output of the analogue-to-digital converter 12 and the input of the shift register store 13 or 16 respectively. A pole 122 of switch 120 is connected to a pole 123 of switch 121 through the intermediary of a network 124 that multiplies alternate received pulse samples by $-1$ in response to clock pulses from the synchroniser 5. A pole 125 of switch 120 is directly connected to a pole 126 of the switch 121. In operation, with switch 120 connected to pole 122 and switch 121 connected to pole 123 (as shown in solid lines) and with the correlation waveform centred on zero frequency, moving targets are displayed on the indicator 18. With the switch 120 connected to pole 125 and the switch 121 connected to pole 126 (as shown in broken lines) and with the correlation waveform centred on zero frequency, stationary targets are displayed on the indicator 18.

We claim:

1. A side-looking pulse radar system for use on a moving carrier and for exploring space laterally with respect to the displacement direction of said carrier including transmitting means for transmitting pulses and receiving means for receiving echo pulses returned from a target and comprising two detectors each connected to receive each echo pulse for detection and each having a reference signal input, an oscillator, means for applying the output of said oscillator in phase quadrature as the reference signal inputs of said two detectors, an analogue-to-digital converter arranged to sample output from both of the detectors, store means connected to the output of said converter for storing samples of echo signals produced by two consecutive transmitted pulses, phase comparator means connected to said said store means for determining the average differential phase between the samples produced by each of the two transmitted pulses, and phase shifting means connected to the output of said store means for altering the phase of the samples produced by the last of the two transmitted pulses in dependence upon said average differential phase, so that the phase of the samples produced by the last of the two transmitted pulses is brought into substantial phase alignment with the samples produced by the first of the transmitted pulses.

2. A radar system as claimed in claim 1 and wherein the phase shifting means is connected to a further store arranged to receive the substantially phased aligned samples, a correlation processor is connected to the output of said further store to perform a correlation process with a correlation waveform, and an indicator is provided for displaying the output of said correlation processor.

3. A radar system as claimed in claim 2 and wherein switch means are arranged at the output of the analogue-to-digital converter and at the input of the first mentioned store with two signal channels therebetween, and in one of said signal channels an arrangement for multiplying sampled received signals by minus one after each alternate transmitted pulse such that, in operation, when the switch means are connected to the channel containing said arrangement and the correlation waveform is centred substantially on zero frequency, a signal indicative of moving targets is obtained and when the switch means are connected to the second channel, a signal indicative of stationary targets is obtained.

4. A radar system as claimed in claim 1 and wherein the store means are shift register stores.

5. A radar system as claimed in claim 1 and arranged so that the transmitting means and the receiving means are connected to an antenna which has a symmetrical directive lobe, the gain of which is maximum along the symmetry axis, said axis being substantially normal at any instant to the displacement direction of said carrier and being outside the vertical plane comprising said direction.

6. A side-looking pulse radar system for use on a moving carrier and for exploring space laterally with respect to the displacement direction of said carrier including transmitting means for transmitting pulses and receiving means for receiving echo pulses returned from a target and comprising two detectors each connected to receive each echo pulse for detection and each having a reference signal input, an oscillator, means for applying the output of said oscillator in phase quadrature as the reference signal inputs of said two detectors, phase comparator means connected to receive output from both the detectors for determining the average differential phase between echo signals produced by two consecutive transmitted pulses, and phase shifting means connected to receive output from both the detectors and from said phase comparator means for altering the phase of the echo signals produced by the last of the two transmitted pulses in dependence upon said average differential phase so that the phase of the echo signals produced by the said last pulse is brought into substantial phase alignment with the echo signals produced by the first of the transmitted pulses.

7. A radar system as claimed in claim 6 and arranged so that the transmitting means and the receiving means are connected to an antenna which has a symmetrical directive lobe, the gain of which is maximum along the symmetry axis, said axis being substantially normal at any instant to the displacement direction of said carrier and being outside the vertical plane comprising said direction.

8. A radar system as claimed in claim 6 and wherein the phase shifting means is connected to a store arranged to receive the substantially phase aligned signals, a correlation processor is connected to the output of said store to perform a correlation process with a correlation waveform, and an indicator is provided for displaying the output of said correlation processor.

9. A radar system as claimed in claim 8 and wherein the correlation processor is arranged to multiply received in-phase and phase-quadrature samples by amplitude modulated in-phase and phase-quadrature samples of said reference correlation waveform.

10. A radar system as claimed in claim 8 and wherein the reference correlation waveform as a centre frequency which is offset relative to the sampled received signal pulse by substantially half the transmitted pulse repetition frequency for displaying moving targets on the indicator.

11. A radar system as claimed in claim 8 and wherein the reference correlation waveform is centred substantially on zero frequency for displaying stationary targets.

12. A radar system as claimed in claim 8 and wherein switch means are arranged at the output of the analogue-to-digital converter and at the input of the store with two signal channels therebetween, and in one of said signal channels an arrangement for multiplying sampled received signals by minus one after each alternate transmitted pulse such that, in operation, when the switch means are connected to the channel containing said arrangement and the correlation waveform is centred substantially on zero frequency, a signal indicative of moving targets is obtained and when the switch means are connected to the second channel, a signal indicative of stationary targets is obtained.

* * * * *